United States Patent [19]
Thompson

[11] 3,971,400
[45] July 27, 1976

[54] PORTABLE VACUUM AND PRESSURE LIQUID TANK APPARATUS

[76] Inventor: David L. Thompson, 7895 Berner St., Long Beach, Calif. 90808

[22] Filed: Jan. 24, 1975

[21] Appl. No.: 543,660

[52] U.S. Cl. .................................. 137/205; 141/59
[51] Int. Cl.² ......................................... B67C 3/16
[58] Field of Search ............ 137/205, 627.5; 141/59

[56] References Cited
UNITED STATES PATENTS

| | | | |
|---|---|---|---|
| 2,664,911 | 1/1954 | Thompson | 137/205 |
| 3,267,509 | 8/1966 | Boyd | 137/205 X |
| 3,378,025 | 4/1968 | Ailde | 137/205 |

*Primary Examiner*—Alan Cohan
*Attorney, Agent, or Firm*—Fulwider, Patton, Rieber, Lee & Utecht

[57] ABSTRACT

A portable vacuum and pressure liquid tank used primarily for the skimming, removal and transfer of industrial waste liquids. A motor-driven pump supplies either super-atmospheric air pressure or a vacuum to the interior of the tank. When the tank interior is connected to vacuum, waste liquid is drawn into the tank. Pressurizing the interior of the tank forces the waste liquid out of the tank. Filling and draining of the tank may be controlled solely by valves.

10 Claims, 7 Drawing Figures

PORTABLE VACUUM AND PRESSURE LIQUID TANK APPARATUS

BACKGROUND OF THE INVENTION

1. Field of the Invention

The present invention relates generally to portable waste liquid collection devices, and more particularly to a portable tank apparatus adapted to load and unload thick liquids.

2. Description of the Prior Art

There have been heretofore proposed tank trucks for loading, transporting and discharging thick industrial waste liquids, such as heavy crude oil, ship bilgewater and the like. Apparatus of this general nature are disclosed in U.S. Pat. No. 2,664,911 issued Jan. 5, 1954 to Clarence S. Thompson and George E. Clark, and U.S. Pat. No. 3,315,611 issued Apr. 25, 1967 to David L. Thompson. Applicant is also aware of U.S. Pat. Nos. 1,587,864; 3,267,509; 3,378,025; and 3,621,893. Such tank trucks usually include a power-driven pump operable to alternatively furnish either a vacuum or superatmospheric air pressure to the interior of the tank. The tank is provided with a fill pipe through which liquid is drawn into the tank when the pump provides a vacuum within the tank, and with a drain pipe through which the liquid is exhausted from the tank when the pump supplies superatmospheric air pressure to the interior of the tank. The tank is additionally provided with a vent pipe which selectively vents the interior of the tank to the atmosphere. Valves are utilized to control fluid flow through these three pipes.

With the conventional vacuum tank truck heretofore utilized, the flow of liquid out of the tank is controlled by a manually operated drain valve and a separate manually controlled bleed valve. If the operator does not properly coordinate the rate of opening of these two valves, the valve element of the intake or discharge valve can be damaged by rocks or gravel entrained in the liquid being loaded or discharged. Such damage requires costly repair.

SUMMARY OF THE INVENTION

It is a major object of the present invention to provide portable vacuum and pressure liquid tank apparatus utilizing novel automatically coordinated valve means for the control of liquid flow into and out of the tank.

It is a further object of the present invention to provide portable vacuum and pressure liquid tank apparatus of the aforedescribed nature which is foolproof in operation so as to avoid damage to such apparatus, and which does not require the constant attention of an operator.

Yet a further object of the present invention is to provide portable vacuum and pressure liquid tank apparatus of the aforedescribed nature wherein abrasion damage to such apparatus is avoided.

Yet another object of the present invention is to provide apparatus of the aforedescribed nature which is rugged in construction and is capable of providing a long and useful service life.

Other objects and advantages of the present invention will become apparent from the following detailed description, when taken in conjunction with the appended drawings.

DESCRIPTION OF THE PREFERRED EMBODIMENT

Figure 1:
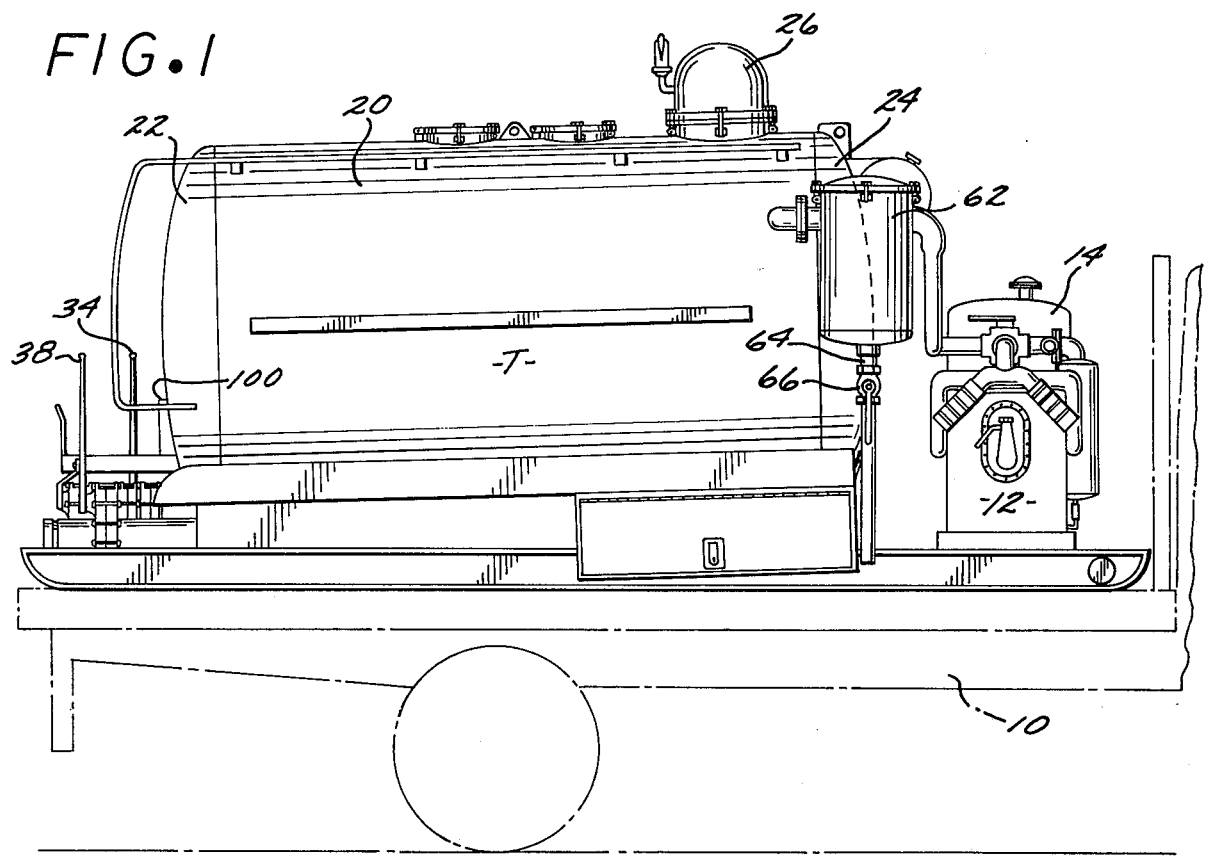
FIG. 1 is a side elevational view of a portable vacuum and pressure liquid tank apparatus embodying the present invention.
Figure 2:
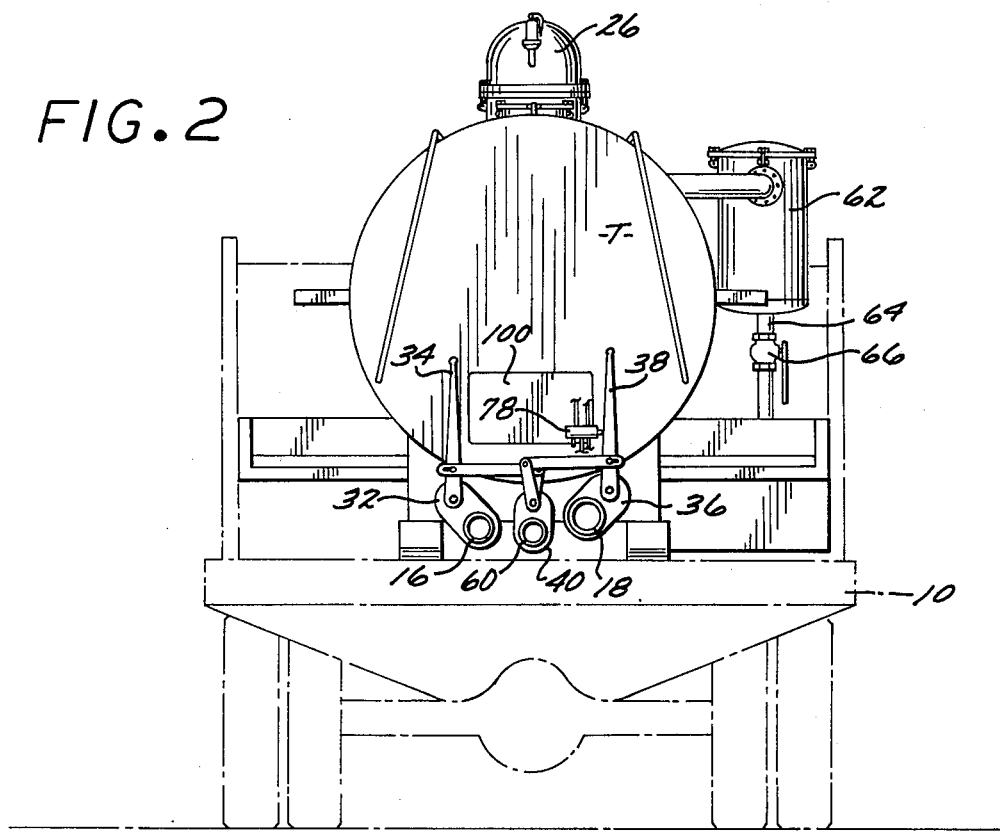
FIG. 2 is a rear elevational view of said apparatus.
Figure 3:
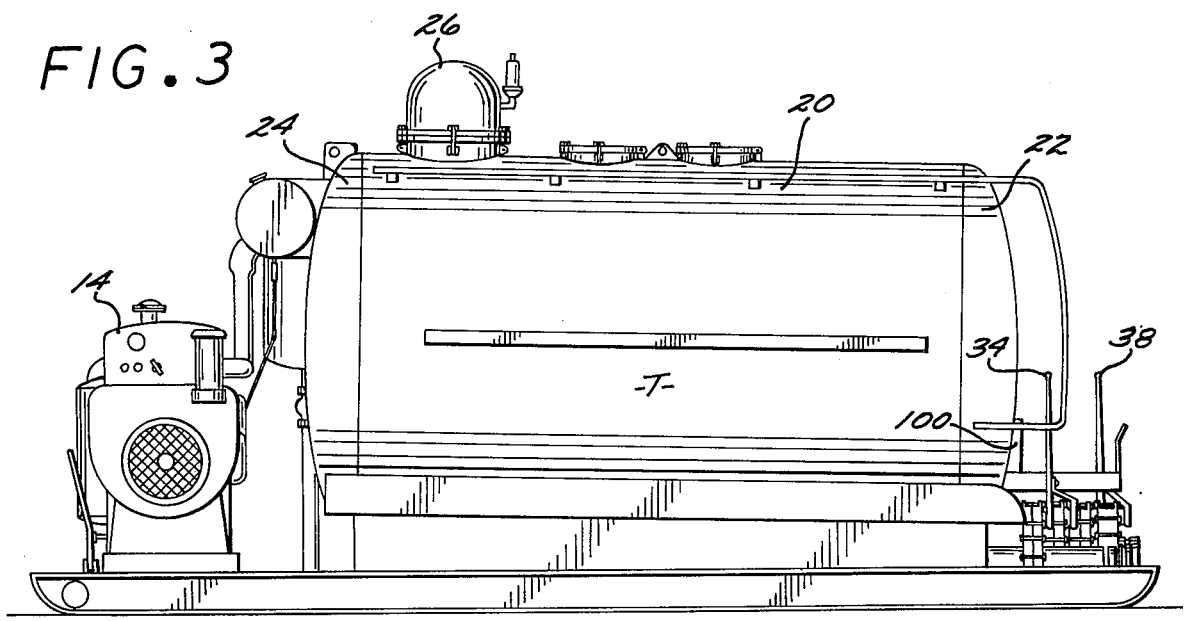
FIG. 3 is a side elevational view of the side of said apparatus opposite that shown in FIG. 1.
Figure 4:
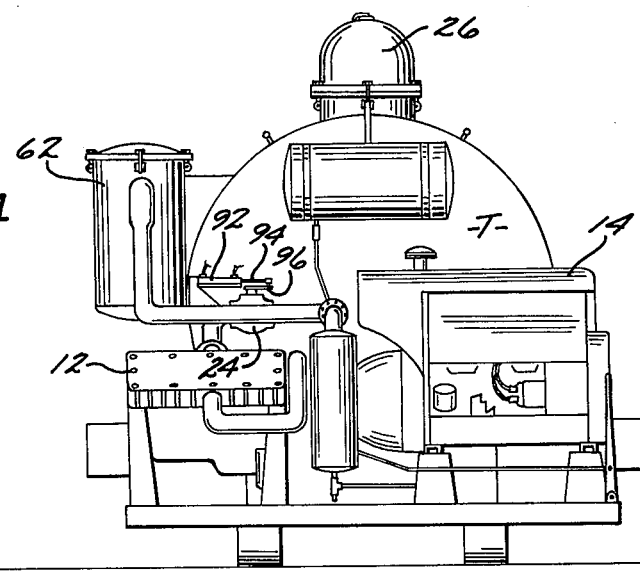
FIG. 4 is a front elevational view of said apparatus.

Referring to the drawings, the portable vacuum and pressure liquid tank apparatus embodying the present invention utilizes a generally cylindrical tank T which is shown mounted upon a skid platform S. The skid-mounted apparatus is preferably small and relatively light whereby it may be transported rapidly to a job site by means of a truck 10. This arrangement permits the apparatus to be conveniently utilized for the skimming, removal and transfer of industrial liquid waste in conjunction with a plurality of portable containers (not shown), the containers being successively filled by such apparatus. A conventional power-driven pump 12 is mounted at the front of the skid unit S. Pump 12 is driven by a conventional internal combustion engine 14, and is valved so that either superatmospheric air pressure or a vacuum can be selectively imposed upon the interior of tank T. Upon a vacuum being applied to the interior of tank T, liquid will be drawn thereinto through an inlet fitting 16 disposed at the rear of the tank. When the pump 12 applies superatmospheric air pressure to the interior of tank T, the liquid contained therewithin will be forced out of the tank through a discharge fitting 18 mounted at the rear of tank T adjacent inlet fitting 16.

More particularly, the tank T will be of conventional construction and is preferably formed from welded steel plates in the form of an elongated cylindrical shell 20, having bumped ends 22 and 24. The entire tank assembly is constructed sufficiently heavy as to withstand both the air pressure and vacuum to which it will be subjected. A conventional dome 26 is provided at the forward portion of tank T.

Figure 6:
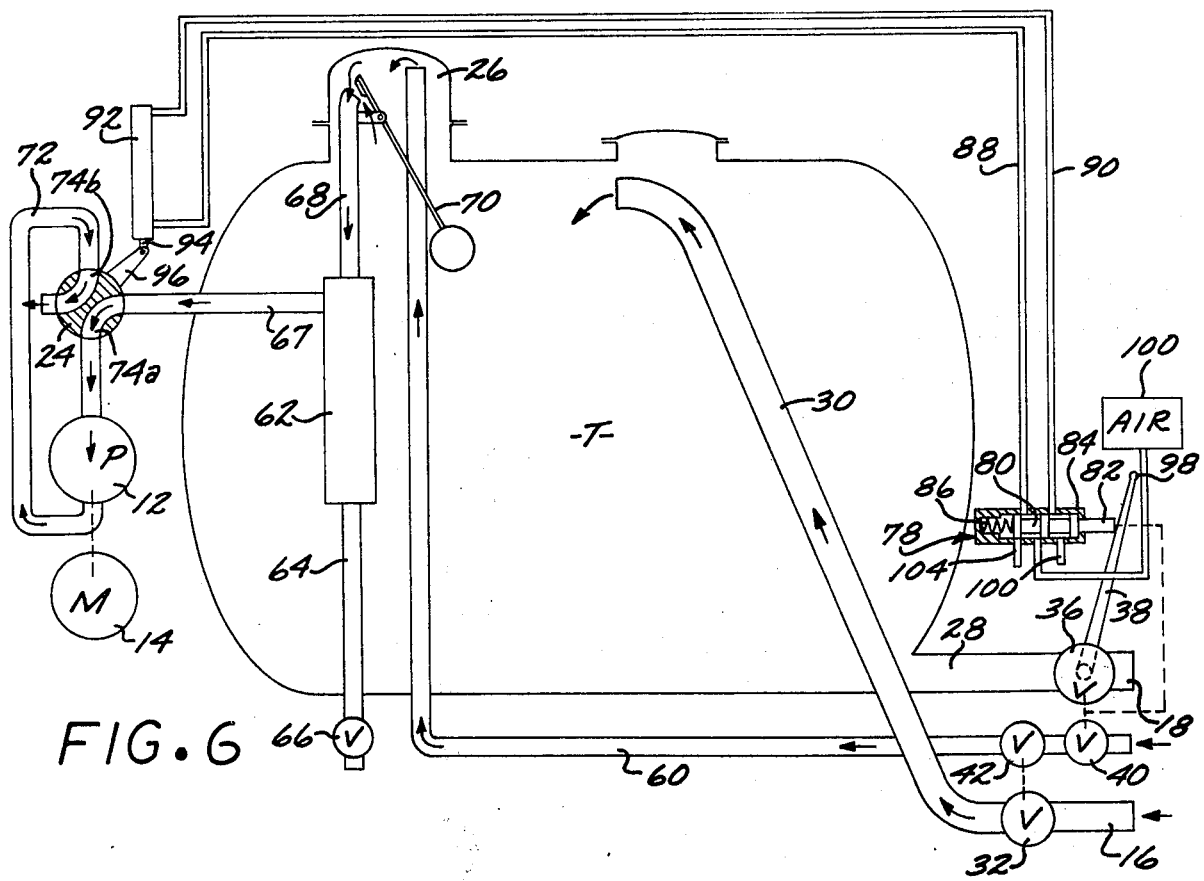
FIG. 6 is a diagrammatic view showing the operation of said apparatus as liquid is drawn into the tank.
Figure 7:
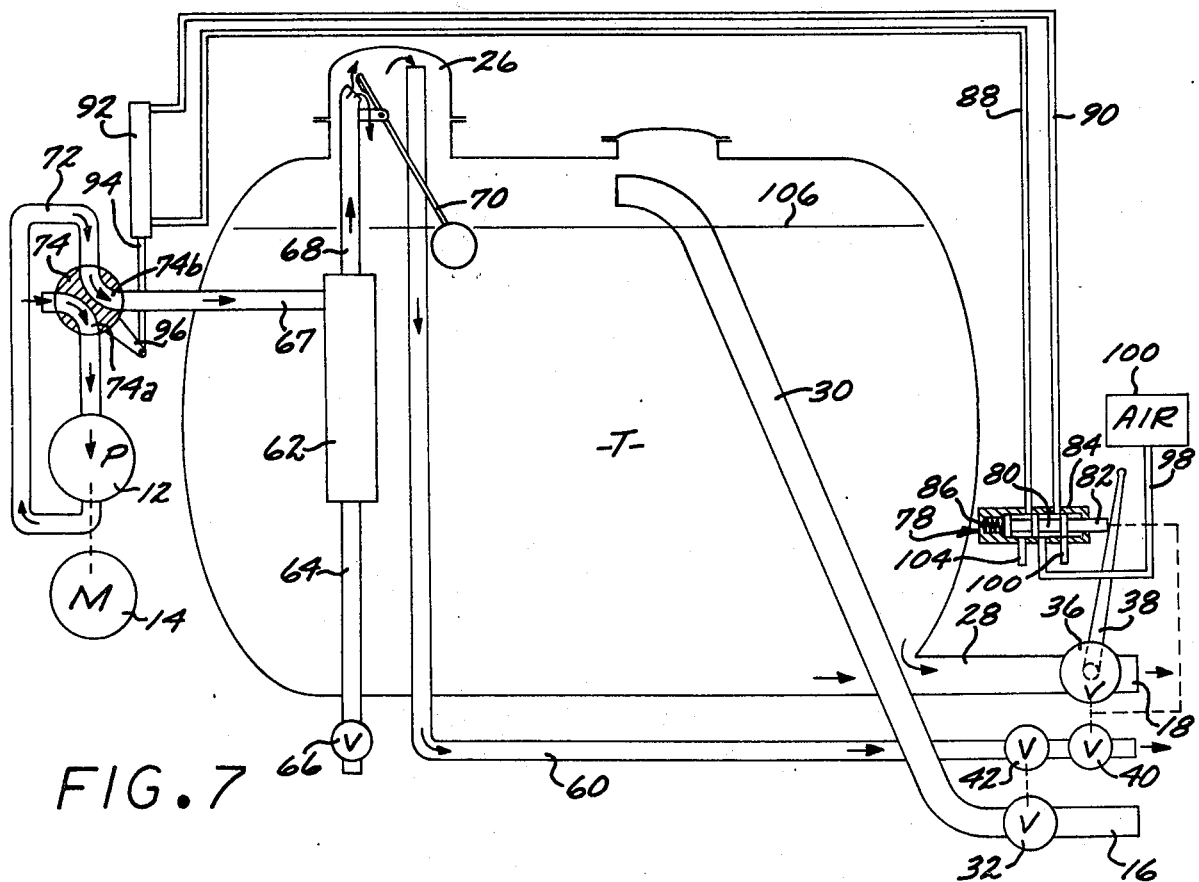
FIG. 7 is a diagrammatic view similar to FIG. 6, showing the operation of said apparatus as liquid is discharged from the tank.

Inlet fitting 16 is disposed at the lower rear portion of tank T to one side of the longitudinal center-line thereof, and such fitting is secured to the lower end of an upwardly and forwardly extending fill pipe 30, as shown in FIGS. 6 and 7. The upper portion of the fill pipe 30 terminates within the upper portion of the tank T. The discharge fitting 18 may be arranged alongside the inlet fitting 16 and is disposed at the opposite side of the longitudinal center-line of tank T. Discharge fitting 18 is connected to a drain pipe 28 that extends forwardly into the rear end of tank T, as shown particularly in FIGS. 6 and 7.

A quick opening gate valve 32 of conventional construction is provided for the inlet fitting 16. Such valve 32 is actuated by means of an upwardly extending manually actuated lever 34. A similar conventional gate valve 36 is provided for the discharge fitting 18, with such drain valve being actuated by a second, upwardly extending manually actuated lever 38. Interposed between the inlet and drain fittings 16 and 18, respectively, is a pair of longitudinally aligned bleed valves 40 and 42, such bleed valves each taking the form of a conventional gate valve actuated by like, short, generally upstanding levers 44 and 46, respectively.

Figure 5:
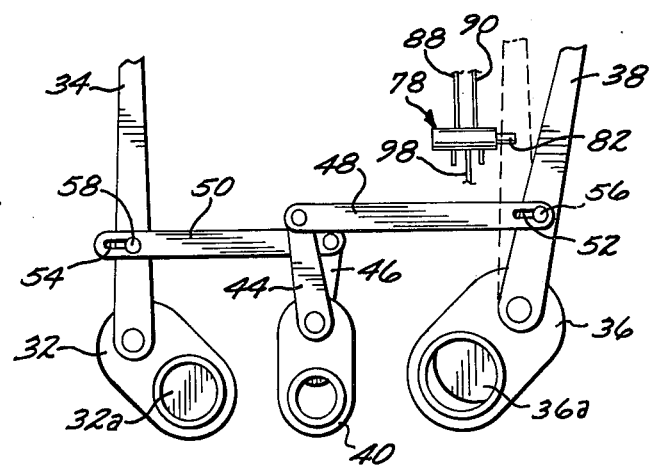
FIG. 5 is a rear elevational view in enlarged scale showing a valving arrangement employed in said apparatus.

As indicated particularly in FIG. 5, the upper end of bleed valve levers 44 and 46 are pivotally connected to the inner ends of a pair of like, generally horizontally extending cross-levers 48 and 50. The outer ends of such cross-levers 48 and 50 are formed with slots 52 and 54, respectively, that slidably receive first and second pins 56 and 58 mounted on the lower intermediate portions of the inlet and drain valve levers 34 and 38. The first and second bleed valves 40 and 42 are mounted in series at the rear end of a longitudinal vent or bleed pipe 60. It should be particularly noted that slots 52 and 54 provide a lost-motion connection between levers 38 and 48 and 34 and 50, respectively. Accordingly, movement of levers 34 and 38 in a direction to open inlet valve 16 and drain valve 18, respectively, will not effect opening and closing, respectively, of bleed valves 42 and 40, respectively, until after valves 16 and 18 have been partially opened. The reason for this arrangement is set forth hereinafter. Vent pipe 60 extends forwardly along the lower portion of tank T and then upwardly to terminate within the confines of the dome 26.

A conventional upstanding scrubber or separator 62 is positioned below the dome 26, as shown in FIGS. 6 and 7. The lower end of scrubber 62 is connected to a depending scrubber drain pipe 64, the lower end of which extends through the lower end of the tank T, and a conventional shutoff valve 66 is mounted at the lower end of such drain pipe. The upper portion of the scrubber 62 is in communication with a horizontal pipe 67 that extends through the front end of tank T to the inlet of pump 12. An upstanding pipe 68 extends from the upper end of the scrubber 62 to the upper interior of dome 26. A conventional float valve 70 controls flow through the upper end of the upstanding pipe 68. The float valve 70 may be similar to that shown in the aforementioned U.S. Pat. No. 2,664,911.

The discharge of pump 12 is in communication with an air exhaust pipe 72 having its opposite end open to the atmosphere. A conventional four-way valve 74 controls the flow of air through pipes 67 and 72. The four-way valve 74 is operated by means of a spool valve, generally designated 78, which in turn is actuated by movement of the aforedescribed lever 38. Thus, spool valve 78 includes a double piston member 80 having a stem 82 that protrudes through one side of spool valve cylinder 84. The double piston member 80 is constantly biased by compression spring 86 towards the protruding end of stem 82, i.e. to the right in FIGS. 6 and 7. Air conduits 88 and 90 connect the spool valve cylinder 84 with the opposite ends of a conventional pneumatic cylinder-piston actuator 92 from which extends a piston rod 94. The free end of piston rod 94 is pivotally connected to a crank 96 that effects rotation of the four-way valve 74. An air supply line 98 connects compressed air tank 100 with the interior of spool valve cylinder 84. Such interior is vented to atmosphere by means of two vent pipes 104 and 106. From the foregoing description, it will be apparent that spring 86 normally maintains spool valve piston member 80 in its right-hand position of FIG. 6. At this time pressurized air from tank 100 flows through air conduit 88 to maintain piston rod 94 of actuator 92 in its retracted position of this figure. When stem 82 of valve 78 is forced to its left-hand position of FIG. 7 by the engagement of lever 38 pressurized air will flow through air pipe 90 to the upper end of unit 92 to thereby extend piston rod 94 to its position of this figure. In this manner, four-way valve 74 is caused to rotate between its positions of FIGS. 6 and 7.

In the operation of the aforedescribed apparatus to collect liquid a conduit, such as a length of hose (not shown), is affixed to the inlet fitting 16. This hose is disposed within a body of liquid (not shown) which is to be drawn into the tank T. The engine 14 is then operated so as to cause the pump 12 to create a vacuum within tank T. At this time the elements of the apparatus will be arranged as shown in FIG. 6. Referring thereto, the float valve 70 is in an open position whereby air may flow downwardly through pipe 68 and then forwardly through pipe 67 into the inlet of pump P through passage 74a of four-way valve 74. The discharge of the pump 12 will be in communication with the atmosphere through pipe 72 and passage 74b of four-way valve 74. Also, at this time, drain valve 36, within discharge fitting 18, will be closed. Bleed valve 42, connected to inlet valve 32, is open. Inlet valve 32 within inlet fitting 16, will be closed, while its interconnected bleed valve 40 will be open.

The vacuum provided by pump 12 produces a vacuum within tank T so as to cause liquid to be drawn through inlet fitting 16 into tank T. This inward liquid flow will continue until inlet valve 32 is closed or until the rising liquid level 106 engages the float 70a of float valve 70 and effects closing of air flow through pipe 68. The inlet valve 32 is then moved to its closed position by means of lever 34. The interconnection of crosslever 50 with lever 34 will move bleed valve 42 to an open position. Since bleed valve 40 is also open, the interior of the tank will then be vented to atmosphere. This will insure that the interior of the tank cannot be subjected to excessive negative air pressure. The liquid-filled tank T is now ready to be transported to a liquid discharging location.

When liquid is to be discharged from the tank, drain valve 36 is moved to its open position of FIG. 7 by manipulation of lever 38, inlet valve 32 remaining closed. Referring now to FIG. 5, such movement of lever 38 is from its solid outline to its dotted outline position of this figure. It will be noted that in its dotted outline position lever 38 will depress the stem 82 of spool valve 78 so as to effect rotation of four-way valve 74 to its position of FIG. 7 in the manner described hereinbefore. In this position, passage 74a connects the atmosphere with the inlet of pump 12, while passage 74b connects pipe 72 with pipes 67 and 68. Accordingly, pressurized air is forced upwardly into the dome 26. Such superatmospheric air will act upon the upper liquid surface 106 to force such liquid downwardly through drain pipe 28, drain valve 36 and out drain fitting 18. At this time air flow through vent pipe 60 is blocked by bleed valve 40.

It should be particularly noted that the rate of liquid flow out of the tank through drain pipe 28 can be controlled solely by the degree of opening of drain valve 36. This feature permits the rate of liquid discharge into a container to be easily controlled so that such container can be topped-off without liquid spillage.

Also, it is not necessary to shut-off engine 10 while a liquid-filled container is replaced with the next container to be filled. It is important to note that the aforementioned lost-motion connection between bleed valve 40 and drain valve 36 through levers 38, 48 and 44 is so designed as to move drain valve 36 to a substantially open position before bleed valve 40 starts to close. This arrangement automatically insures that liquid flow through drain valve 36 will not start until such valve has been opened sufficiently that its movable plate element 36a (See FIG. 5) cannot be damaged by abrasive foreign material gravel or rocks (not shown) entrained in such liquid, it being understood that once air flow through bleeder line 60 is shut-off liquid will rapidly surge out drain valve 36. With respect to the aforementioned lost-motion connection between lever 34 and cross-lever 50 once air flow through bleeder line 60 is shut-off liquid will surge rapidly through inlet valve 32 into the interior of tank T. It is therefore desirable that inlet valve element 32a be partially open before such surge occurs. Preferably, valves 32 and 36 be opened up to one-half of their fully-opened and fully-closed positions, respectively, before the bleed valves 42 and 40 start moving towards their closed position. It will be apparent that an inexperienced operator could easily damage the plate elements of the valves 32 and 36 if this arrangement were not provided. It should be further noted that positioning of the levers 34 and 38 at one location at the rear of tank T makes it unnecessary for the operator to leave this area. Accordingly, the operator can readily observe the liquid filling and discharging operations. This feature is particularly advantageous where the tank T is being filled. Under filling conditions a sudden surge of liquid could rapidly fill the tank T. Upon such occurrence the operator may merely manipulate lever 34 so as to close inlet valve 32. It is not necessary for the operator to leave his position at the rear of the tank and immediately shut-off the engine 14.

Various modifications and changes may be made with respect to the foregoing detailed description without departing from the spirit of the present invention.

I claim:

1. Portable vacuum and pressure liquid tank apparatus comprising:
   a tank;
   a power-driven pump adapted to supply either air pressure or a vacuum to the interior of said tank;
   an inlet conduit through which liquid is admitted to said tank;
   a discharge conduit through which liquid is discharged from said tank;
   a bleeder line connecting the atmosphere with the upper interior of said tank;
   an inlet valve in said inlet conduit having a valve element movable between an open and a closed position;
   a drain valve in said discharge conduit having a valve element movable between an open and a closed position;
   first and second bleed valves arranged in series in said bleeder line;
   first and second levers that actuate said inlet and drain valves respectively;
   first linkage means interconnecting said first lever and said first bleed valve so that movement of said inlet valve towards an open position will effect movement of said first bleed valve towards an open position;
   second linkage means interconnecting said second lever and said second bleed valve so that movement of said drain valve towards an open position will effect movement of said second bleed valve towards a closed position; and
   lost-motion connection means interposed in said first and second linkage means constructed and arranged so that said first and second bleed valves will not be moved towards an open position and closed position, respectively, until after said inlet and drain valves have been moved towards an open and a closed position, respectively, to thereby avoid damage to the valve elements of said inlet and discharge valves by foreign matter entrained in said liquid.

2. Portable vacuum and pressure liquid tank apparatus as set forth in claim 1 wherein said inlet and drain valves are moved to about one-half their fully-opened and fully-closed positions, respectively, before said bleed valves start moving towards their closed position.

3. Portable vacuum and pressure liquid tank apparatus as set forth in claim 1 wherein said lost-motion connection means include slots and pins interposed between said levers and said linkage means.

4. Portable vacuum and pressure liquid tank apparatus as set forth in claim 1 which further includes an air valve interposed between said pump, the interior of said tank and the atmosphere, and actuator means for said air valve that are operated by said second lever.

5. Portable vacuum and pressure liquid tank apparatus as set forth in claim 1 wherein said first and second levers are positioned adjacent one another in the vicinity of said inlet and drain valves.

6. Portable vacuum and pressure liquid tank apparatus as set forth in claim 2 wherein said lost-motion connection means include slots and pins interposed between said levers and said linkage means.

7. Portable vacuum and pressure liquid tank apparatus as set forth in claim 2 which further includes an air valve interposed between said pump, the interior of said tank and the atmosphere, and actuator means for said air valve that are operated by said second lever.

8. Portable vacuum and pressure liquid tank apparatus as set forth in claim 2 wherein said first and second levers are positioned adjacent one another in the vicinity of said inlet and drain valves.

9. Portable vacuum and pressure liquid tank apparatus as set forth in claim 3 which further includes an air valve interposed between said pump, the interior of said tank and the atmosphere, and actuator means for said air valve that are operated by said second lever.

10. Portable vacuum and pressure liquid tank apparatus as set forth in claim 3 wherein said first and second levers are positioned adjacent one another in the vicinity of said inlet and drain valves.

* * * * *